Aug. 3, 1965  W. L. PUTHUFF  3,197,833
FASTENER
Filed March 12, 1963  2 Sheets-Sheet 1
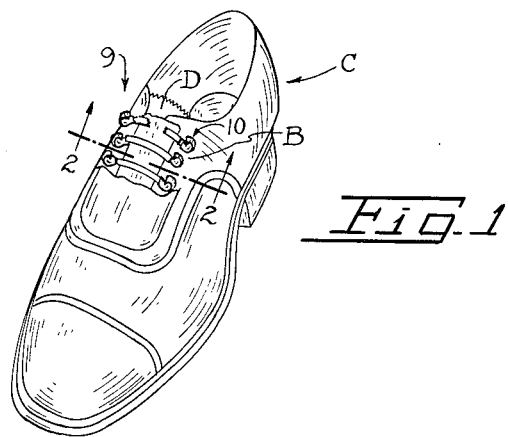
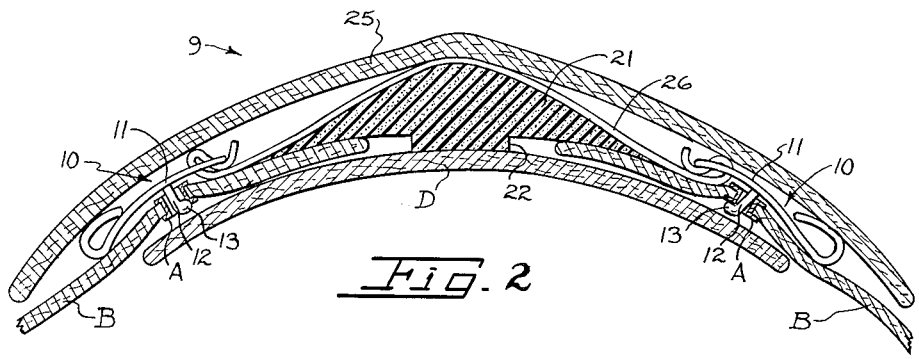
INVENTOR.
WILLIAM L. PUTHUFF
BY
Townsend and Townsend
ATTORNEYS Aug. 3, 1965  W. L. PUTHUFF  3,197,833
FASTENER Filed March 12, 1963  2 Sheets-Sheet 2

INVENTOR.
WILLIAM L. PUTHUFF
BY
Townsend and Townsend
ATTORNEYS

United States Patent Office 3,197,833
Patented Aug. 3, 1965

3,197,833
FASTENER
William L. Puthuff, 808 East 3rd South, Apt. 1,
Salt Lake City, Utah
Filed Mar. 12, 1963, Ser. No. 264,628
11 Claims. (Cl. 24—146)

The present invention relates in general to an adjustable fastener and more particularly to a lacing replacement cover useful, for example, for replacing the laces of a shoe.

The principal object of the present invention is to provide a lacing replacement fastener for joining the adjacent free sides of two flaps and includes a hook member having a curved main body portion, a handle portion, and a hook portion projecting from the concave side of the curved main body portion and provided with a hook on the end thereof, one of such hook members being held in place over each of a number of lacing eyes by the spring action of the curved main body portion. Means such as an elastic band is provided for joining the hook member on the adjacent flaps to hold the flaps together.

One feature and advantage of this fastener is that the fastener can be placed in existing lacing holes and a simple and more convenient joining means used to replace the lace. When an elastic band is used for the joining means, the fastener can remain in place without further adjustment such as takes place each time a lace is untied.

Another object is the provision of spaced-apart slots in the main body portion of the hook members of such a fastener to receive an elastic band and permit adjustment of the length of the elastic band.

Another feature and advantage of this fastener is that it can be provided on any shoe or similar article provided with lacing eyes and adjusted to provide the proper tension between the shoe flaps.

Another feature and advantage of this fastener is that once it is in place it needs no further adjustment. The fastener assembly provides sufficient tension for snugly holding the shoe in place on the wearer's foot and yet enables the shoe to be removed and put back on without adjustment or the necessity for untying or tying laces.

Another object of the invention is to provide such a fastener assembly with a hook member having a curved handle portion, the end of which projects through the curved main body portion of the hook member to serve as the hook for holding the hook member in place.

Another feature and advantage of this handle construction is that the handle portion serves as a handle as well as a holding hook and provides spring tension for maintaining the hook member in place in the shoe eye. Thus, the hook member can easily be inserted in and taken out of a shoe eye but will be held snugly in place when in use.

Still another object of this invention is the provision in such a fastener of a hook member in which the hook portion is punched out of the curved main body portion of the hook member.

Still another feature and advantage of such a fastener is that the hook member is one integral piece and is easily produced and assembled in place.

Still another object of the invention is the provision of such a fastener in which the main body portion is provided with an opening therein and the handle on the convex side of the central body portion has an end extension which projects through this opening to serve as the hook portion.

Still another feature and advantage of this fastener structure lies in the fact that the curved central portion and the handle extension provide a spring action to hold the hook member in place.

Still another feature and advantage of such a hook member lies in the fact that by depressing the handle the spring action of both the main body portion and the handle extension is relieved and the hook member more easily inserted in place and removed.

Still another object of the invention is the provision of a tongue pad which runs the length of the fastener assembly beneath the elastic bands and has an upper portion curved to the contour of the shoe and a lower portion which projects between the shoe flaps and bears against the shoe tongue.

An additional feature and advantage of this tongue pad is that it contours the fastener assembly to the contour of the shoe and holds the tongue of the shoe in place.

Still a further object of this invention is to provide a cover over the fastener assembly secured to the tongue pad.

Still a further feature and advantage of this covered fastener assembly is that the hook members with the elastic bands, tongue pad and cover attached thereto can be inserted in place and then the cover lifted to adjust the elastic bands to desired length. The cover can then be lowered and will cover the fastener assembly.

Still a further feature and advantage of this cover is that a cover made in a number of sections can cover the individual portions of the fastener assembly to produce a decorative effect to the assembly and when in one piece can entirely cover the fastener assembly, conform the shape of the shoe in the lacing area to the contour of the rest of the shoe and produce a decorative effect.

Still another object of this invention is to provide such a hook fastener with a curved main body portion and a portion of this main body portion punched outwardly on the convex side of the central portion to form a hook to serve as a lacing bight in case laces are desired.

Still a further feature and advantage of the fastener with this bight is that while the fastener can be used with an elastic band to hold the shoe flaps together, it is constructed so that, if desired, laces may also be used.

Still another feature and advantage of the punched bight lies in the fact that an extension end of the handle which forms the hook portion can pass through the opening in the main body portion left by the punched bight.

Other objects of the present invention will become apparent upon reading the following specification and referring to the accompanying drawings in which similar characters of reference represent corresponding parts in each of the several views.

In the drawing:

FIG. 1 is a perspective view, partially broken away, showing a fastener according to the present invention applied to a shoe;

FIG. 2 is a sectional view of a portion of the structure shown in FIG. 1 taken along line 2—2;

While the invention will be described as applied to the shoe eyes of a shoe for replacing lacing usually applied thereto, it is obvious that the invention is equally applicable to other devices which have eyes for receiving laces to hold and lace two members together.

Figure 3:
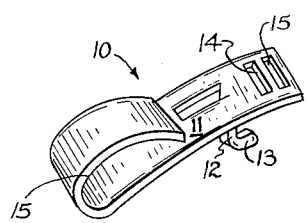
FIG. 3 is an enlarged perspective view of the hook member shown in FIG. 2.

Referring now to the drawing, and especially FIGS. 1–3, a fastener assembly 9 according to the present invention includes a plurality of hook members 10 each of which is inserted in a shoe eye A on one of the two adjacent shoe flaps B of a shoe generally indicated at C.

The hook members 10 made of any substantially rigid material such as metal or plastic, include a slightly curved main body portion "with a hook portion 12 projecting from the concave side of the main body portion." The hook portion 12 is punched from the middle of the main body portion 11 and is bent at its end to form a hook 13. Two parallel spaced-apart elongate slots 14 and 15 are provided adjacent main body portion 11 toward which the hook 13 is directed. On the opposite end of the main body portion 11 from the slots 14 and 15 is a curved handle portion 16 which projects above and returns to the plane of the main body portion 11. The slots 14 and 15 are constructed to receive an elastic band 17 which is made of any suitable elastic material capable of stretching under tension and resuming its normal length and position when tension is removed.

An elastic band 17 stretches between each pair of hook members 10 positioned in place on the shoe over opposite lacing eyes A in the shoe flaps B.

A tongue pad 21 positioned beneath the elastic bands 17 is provided with a rounded upper portion which conforms to the contour of the shoe and a downwardly projecting portion 22 that fits between the shoe flaps B and holds the shoe tongue D in place. A cover 24 secured to the pad 21, such as by stitching at points 25 and 26, covers the entire fastener assembly. The cover 24 is made of leather, plastic or other suitable material and is held snugly to the shoe by the pad 21 which is held in place by the elastic bands 17.

The fastener assembly is positioned on the shoe by first inserting into the shoe eyes A the hook member 10 with the elastic bands 17 secured thereto. Then by lifting the cover 24 the length of the elastic bands 16 can be adjusted to provide the proper tension between the shoe flaps B, and the cover 24 is then allowed to fold back over the elastic bands 17 and the hook members 10 to completely cover the fastener assembly. While the fastener according to this invention is useful for all types of shoes with laces, it is especially useful for replacing shoe laces which young children can not tie.

While the fastener assembly 9 is preferably removable from the shoe, it is obvious that it could be fixedly secured to the shoe if desired by attaching the pad 21 or cover 24 to the shoe tongue D.

Figure 4:
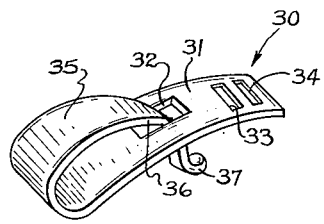
FIG. 4 is an enlarged perspective view of an alternative embodiment of the hook member shown in FIG. 3.

An alternative structure for the hook members is shown in FIG. 4. As illustrated, a hook member 30 is provided with a slightly curved main body portion 31 which has an opening 32 punched in the middle thereof. Elongate slots 33 and 34 are provided at one end of the main body portion 31 for adjustably securing an elastic band thereto, and a loop handle 35 is provided at the other end of the main body portion 31. The loop handle 35 which projects above the main body portion 31 has a reduced width end extension 36 which projects through the opening 32 in the main body portion 31 and is provided with a hook 37 on the end thereof. Besides serving as a handle, the loop 35 provides a spring action to the hook 37 for hodling the hook member 30 in a shoe eye.

Figure 5:
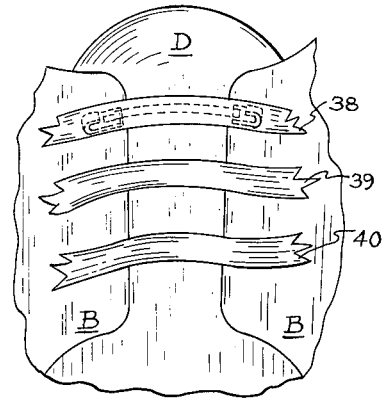
FIG. 5 is an elevational view, showing an alternative embodiment of the present invention wherein the cover member is made up of a plurality of sections, each one of which covers at least one of the hook member and elastic band sub-assemblies, one of which is shown in phantom.

While the cover 24 shown in FIG. 1 can be one solid piece which covers the entire fastener assembly, it can be made up of two or more individual pieces, 38, 39 and 40, each of which covers one or more hook member and elastic band subassemblies as illustrated in FIG. 5.

Figure 6:
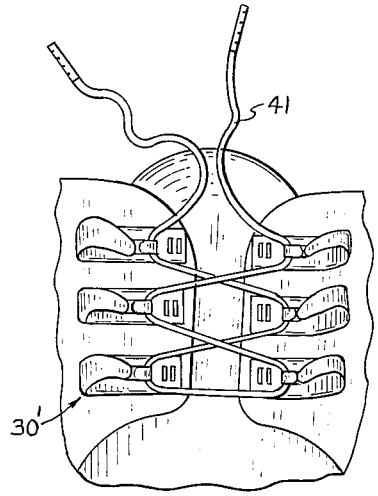
FIG. 6 is an elevational view of an alternative embodiment of the present invention applied to a shoe and using a lace to hold the hook members together.
Figure 7:
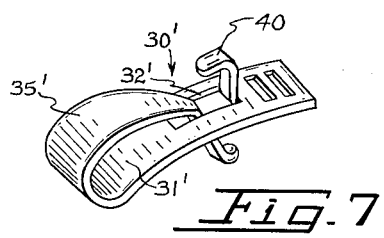
FIG. 7 is an enlarged perspective view of the hook member shown in FIG. 6.

Referring now to FIGS. 6 and 7, a hook member 30', similar to the hook member 30 shown in FIG. 4 is provided with a bight for utilizing the hook members with a shoelace 41. As illustrated clearly in FIG. 7, the hook member 30' includes an upstanding hook or bight 42 which constitutes the punched-out portion of the main body portion 31' and forms the opening 32'. Thus, while the hook member 30' can be utilized with the elastic bands as shown in FIG. 2, it can also be utilized with the lace 41. Instead of the punched-out hook 40 the bight can be of the more conventional variety and riveted onto the hook member. Also, the lace 41 can either be conventional lace of rigid material or made up of an elastic material whereby once the lace is first tied, the wearer can slip in or out of the shoe without untying the lace. Obviously, the lace 41 can be used in combination with the tongue pad and cover described with respect to FIGS. 1 and 2 for holding the tongue in place and providing cover for the fastener assembly.

Although the foregoing invention has been described in some detail by way of illustration and example for purposes of clarity of understanding it is understood that certain changes and modifications may be practised within the spirit of the invention and scope of the appended claims.

What is claimed is:

1. A fastener for joining the adjacent free sides of two flaps, each of said flaps having a front and a back surface and a plurality of openings therein comprising: a plurality of hook members of resilient material each constructed and arranged to remain in place on said flap front surface over one of said openings each of said hook members having a curved main body portion, a hook portion projecting from the central portion of the concave side of said curved main body portion and provided with a hook on the end thereof, and a handle portion connected to said main body portion on the convex side thereof, said curved main body portion of said hook members of said resilient material providing a spring action to hold said hook member over one of said openings when said hook portion projects through said one opening and only said hook bears against said back surface of said flap, said spring action firmly urging said hook against the back surface of said flap and portions of said concave side of said main body portion against the front surface of said flap; and means for joining together hook members on said adjacent sides of said flaps.

2. The fastener according to claim 1 and including a bight secured to the convex side of said main body portion of each of said hook members, said bights constructed and arranged to receive a lace for lacing together hook members on said adjacent sides of said flaps.

3. The fastener according to claim 1 characterized further in that said hook portion is punched out of said main body portion and is bent at its extended end to form said hook.

4. The fastener of claim 1 characterized further in that said main body portion is provided with an opening therein and said hook portion comprises an end extension of said handle portion projecting through said opening in said main body portion, the end of said end extension being bent to form said hook, said curved main body portion and said handle portion producing a spring action to hold said hook member over one of said openings when said end extension of said handle portion projects through said one opening.

5. A fastener for joining the adjacent free sides of the lacing flaps on a shoe, each of said lacing flaps having a front and a back surface and a series of lacing eyes comprising: a plurality of hook members of resilient material each constructed and arranged to remain in place on said flap front surface over said lacing eyes and having a curved main body portion, a hook portion protruding from the central portion of the concave side of said main body portion and provided with a hook on the end thereof, and a handle portion connected to said main body portion on the convex side thereof, said curved main body portion providing a spring action to hold said hook member over one of said lacing eyes when said hook portion projects through said lacing eye and said hook bears against said back surface of said flap, said spring action firmly urging said hook against the back surface of said flap at said lacing eye and portions of said concave side of said main body portion against the front surface of said flap; and at least one elastic band for joining hook members on said adjacent sides of said flaps, each of said hook members having spaced-apart slots to receive said elastic band and to permit adjustment of the length of said band stretched between hook members, whereby, when said hook portions have been inserted into the lacing openings and said elastic band passed through the spaced-apart openings in said hook members, the length of the elastic band between hook members is adjusted to provide desired spacing and tension between said hook members.

6. The fastener of claim 5 characterized further in that said hook portion is punched out of said main body portion and is bent at its extended end to form said hook.

7. The fastener of claim 5, and including a longitudinal pad positioned between said lacing flaps and beneath said elastic bands, the upper surface of said pad extending between the front surfaces of said lacing flaps and curved to conform to the contour of the shoe, said pad having a portion protruding from the bottom thereof between said lacing flaps and constructed and arranged to hold the tongue of the shoe in place.

8. The fastener according to claim 7 including a cover member secured to said pad and covering the hook members and elastic band on a shoe when in place.

9. The fastener according to claim 5 including a bight secured to the convex side of said main body portion of each of said hook members, said bights constructed and arranged to receive a lace for lacing together hook members on said adjacent sides of said flaps.

10. The fastener of claim 5 characterized further in that said main body portion is provided with an opening therein and said hook portion comprises an end extension of said handle portion projecting through said opening in said main body portion, the end of said end extension being bent to form said hook, said curved main body portion and said handle portion producing a spring action to hold said hook member over one of said openings when said end extension of said handle portion projects through said one opening.

11. The fastener of claim 10 and including a bight on the convex side of said main body portion constructed and arranged to receive a lace for lacing together hook members on said adjacent sides of said flaps, said bight being punched out of said main body portion to form said opening in said main body portion.

References Cited by the Examiner

UNITED STATES PATENTS

| | | | |
|---|---|---|---|
| 276,573 | 5/83 | Foster | 24—146 |
| 630,984 | 8/99 | Lovell | 24—146 |
| 774,719 | 11/04 | Estes | 24—146 |
| 1,348,703 | 8/20 | Ferris | 24—203 |
| 1,505,430 | 8/24 | Roberts et al. | 24—145 |
| 3,059,353 | 10/62 | Guidici | 36—50 |

DONLEY J. STOCKING, *Primary Examiner.*